UNITED STATES PATENT OFFICE.

JOHN N. CAROTHERS AND WILLIAM H. ROSS, OF WASHINGTON, DISTRICT OF COLUMBIA.

PROCESS FOR THE DIRECT PREPARATION OF CRYSTALLIZED PHOSPHORIC ACID.

1,283,398.  Specification of Letters Patent.  Patented Oct. 29, 1918.

No Drawing.  Application filed February 18, 1918.  Serial No. 217,942.

(DEDICATED TO THE PUBLIC.)

*To all whom it may concern:*

Be it known that we, JOHN N. CAROTHERS and WILLIAM H. ROSS, citizens of the United States of America, and employees of the Department of Agriculture of the said United States, residing at Washington, in the District of Columbia, (whose post-office address is Department of Agriculture, Washington, D. C.,) have jointly invented a new and useful Process for the Direct Preparation of Crystallized Phosphoric Acid.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

Our invention relates to the direct preparation of phosphoric acid in crystalline form and of hydrofluoric acid as a by-product.

The object of our invention is to obtain phosphoric acid directly in such a state as will permit its ready purification by crystallization and at the same time recover, as a by-product, any hydrofluoric acid associated with the phosphoric acid in its original state. A further object of our invention is to produce an acid in such a form as will afford easier and less expensive transportation.

In one method now generally used in the preparation of phosphoric acid, material such as bones or phosphate rock is treated with such a quantity of sulfuric acid as will give phosphoric acid in solution and also insoluble calcium sulfate. This process yields directly only a comparatively dilute solution of phosphoric acid and will contain as impurities greater or less amounts of all the constituents occurring in the raw materials used. More concentrated solutions are obtained by evaporation with consequent loss of a portion of the hydrofluoric acid. The portion of the latter remaining in the concentrated solution of phosphoric acid is then removed by chemical means.

Another method generally used in the preparation of phosphoric acid consists in smelting phosphate rock with sand and coke in an electric furnace and in collecting the evolved phosphorus oxids in a system of baffle towers sprayed with water or dilute acid. The heat from these gases as they enter the first absorption towers is utilized to evaporate the water from the dilute acid and by this means a more concentrated acid may be obtained directly than in the sulfuric acid method. It is not practical, however, even by this method to obtain an acid much exceeding 50 per cent. concentration which is much below the concentration necessary to give crystallized acid. Moreover, by this method of collection the phosphoric acid becomes contaminated with all the hydrofluoric acid evolved in the treatment of the rock and will require special treatment for the removal of the latter before acid prepared in this way can be used in the manufacture of materials such as foodstuffs in which the presence of fluorin would be objectionable.

In carrying out our process use is made of the process of electrical precipitations for recovering the phosphorus oxid fumes evolved in any smelting operation as in that of the blast furnace or when phosphate rock, silicious material and carbon are ignited in an electric or other furnace. The form in which phosphorus is evolved in any of these operations is principally that of the pentoxid, which is a material of an extremely hygroscopic nature. In the smelting of phosphate rock by any process there is always an excess of moisture in the air required to oxidize the phosphorus and in the charge used, above that necessary completely to convert the phosphorus pentoxid into phosphoric acid. It thus happens that as the phosphorus pentoxid escapes from the furnaces it rapidly combines with the moisture with which it is associated and is consequently precipitated in the form of phosphoric acid which runs down the sides of the precipitating pipes and may be collected in a continuous stream from the outlet leading from the receiving chamber.

When the gases on leaving the furnace are passed through a baffle tower or other connecting system of such radiating surface, they are cooled below 100° C. before entering the precipitating pipes, then the concentration of the acid obtained will depend on the amount of moisture entering the system. This will vary with the moisture content of the charge and with the amount of air drawn through the furnace. By varying either or both of these factors acid of any desired concentration may be obtained. We find, however, that when the gases from the furnace are allowed to enter the precipitator at a temperature above 100° C. the concentration of the acid is then no longer dependent on the amount of water vapor passing over with the phosphorus fumes. The phosphorus pentoxid will combine with the moisture with which it is associated to make phosphoric acid as before, but little or no precipitation of excess moisture will take place under these conditions for at the temperature stated water vapor will pass through the system without condensation and consequently will not be acted upon by the precipitator. At a temperature of about 230° C. orthophosphoric acid is changed to pyrophosphoric acid and the latter in turn, is changed to meta phosphoric acid at a temperature above 290° C. For the preparation of orthophosphoric acid it is necessary, therefore, to recover it at a temperature below 230° C. If the temperature is maintained above 100° the acid collected is of such a concentration that it crystallizes to a solid mass on cooling to a temperature below its melting point. Crystallization may very frequently be hastened by adding to the mass a crystal of acid previously prepared.

Purification of the acid obtained in this way may be very readily effected by melting the crystals, adding a small quantity of water, recrystallizing and repeating the process several times.

The process of precipitating the acid at a temperature above 100° C. has other advantages, however, in addition to giving a concentrated acid in crystalline form. Not only is the excess moisture gotten rid of but by the same treatment all constituents which are evolved from the furnace with the phosphoric acid, and which are volatile at a temperature below 100° C. are eliminated. The most important of these, when using phosphate rock as a source of raw material, is hydrofluoric acid. At a temperature above 100° C. this acid remains in the gaseous state and consequently passes through the precipitator without precipitation, excepting the small portion represented by the solubility of hydrofluoric acid in phosphoric acid at the temperature of precipitation. The hydrofluoric acid, as it escapes from the precipitator, may then be recovered in any way well known in the arts as by means of a scrubbing tower or by a combined spraying and electrical precipitating system.

Having thus described our process, we claim:

1. A process for the direct preparation of crystallized phosphoric acid which consists in collecting by means of electrical precipitation the phosphorus oxid fumes evolved in any smelting operations, using a connecting flue and precipitating system of such radiating surface that the fumes will be precipitated at a temperature above 100° C., and allowing the collected acid to cool to a temperature below its melting point.

2. A process for the direct preparation of crystallized phosphoric acid which consists in collecting by means of electrical precipitation the phosphorus oxid fumes evolved in any smelting operation, using a connecting flue and precipitating system of such radiating surface that the fumes will be precipitated at a temperature above 100° C. and below 230° C., and allowing the collected acid to cool to a temperature below its melting point.

3. A process for the direct preparation of crystallized phosphoric acid which consists in collecting by means of electrical precipitation the phosphorus oxid fumes evolved in any smelting operation, providing the necessary moisture, when such is not already present in sufficient amount for the complete conversion of the oxids into phosphoric acid, using a connecting flue and precipitating system of such radiating surface that the acid will be precipitated at a temperature above 100° C., and allowing the collected acid to cool to a temperature below its melting point.

4. A process for the direct preparation of crystallized phosphoric acid which consists in collecting by means of electrical precipitation the phosphorus oxid fumes evolved in any smelting operation, using a connecting flue and precipitating system of such a radiating surface that the fumes will be precipitated at a temperature above 100° C. for the elimination of excess moisture and hydrofluoric acid, and allowing the collected acid to cool to a temperature below its melting point.

In witness whereof, we affix our signatures in the presence of two subscribing witnesses.

JOHN N. CAROTHERS.
WILLIAM H. ROSS.

Witnesses:
RAYMOND L. JOY,
DUNCAN STUART.